US 9,189,226 B2

(12) United States Patent
Driesen et al.

(10) Patent No.: US 9,189,226 B2
(45) Date of Patent: Nov. 17, 2015

(54) SOFTWARE LOGISTICS PROTOCOLS

(71) Applicants: Volker Driesen, Heidelberg (DE); Andrey Engelko, Bad Schoenborn (DE); Andreas Jahr, Karlsruhe (DE); Fabrizio Muscarella, Mannheim (DE); Georg Storz, Hessigheim (DE)

(72) Inventors: Volker Driesen, Heidelberg (DE); Andrey Engelko, Bad Schoenborn (DE); Andreas Jahr, Karlsruhe (DE); Fabrizio Muscarella, Mannheim (DE); Georg Storz, Hessigheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/044,123

(22) Filed: Oct. 2, 2013

(65) Prior Publication Data
US 2014/0380274 A1 Dec. 25, 2014

Related U.S. Application Data

(60) Provisional application No. 61/839,224, filed on Jun. 25, 2013.

(51) Int. Cl.
*G06F 9/44* (2006.01)
*G06F 11/30* (2006.01)

(52) U.S. Cl.
CPC *G06F 8/70* (2013.01); *G06F 11/30* (2013.01); *G06F 8/20* (2013.01); *G06F 8/71* (2013.01)

(58) Field of Classification Search
None
See application file for complete search history.

(56) References Cited

U.S. PATENT DOCUMENTS

| 7,523,142 | B2 | 4/2009 | Driesen et al. |
| 7,783,651 | B2 | 8/2010 | Muscarella |
| 7,895,599 | B2 | 2/2011 | Muscarella |
| 8,185,906 | B2 | 5/2012 | Muscarella |
| 8,200,634 | B2 | 6/2012 | Driesen et al. |
| 8,250,135 | B2 | 8/2012 | Driesen et al. |
| 8,291,038 | B2 | 10/2012 | Driesen |
| 8,301,610 | B2 | 10/2012 | Driesen et al. |
| 8,356,010 | B2 | 1/2013 | Driesen |
| 8,380,667 | B2 | 2/2013 | Driesen |
| 8,392,573 | B2 | 3/2013 | Lehr et al. |
| 8,402,086 | B2 | 3/2013 | Driesen et al. |
| 8,412,739 | B2 | 4/2013 | Engelko et al. |
| 8,434,060 | B2 | 4/2013 | Driesen et al. |
| 8,479,187 | B2 | 7/2013 | Driesen et al. |
| 8,527,471 | B2 | 9/2013 | Hoprich et al. |
| 8,762,929 | B2 * | 6/2014 | Driesen ......................... 717/100 |

(Continued)

OTHER PUBLICATIONS

U.S. Appl. No. 13/927,669, filed Jun. 26, 2013, Andrey Engelko et al.

*Primary Examiner* — Don Wong
*Assistant Examiner* — Shirin Alizadeh
(74) *Attorney, Agent, or Firm* — Fish & Richardson P.C.

(57) ABSTRACT

Techniques for using a software logistics protocol include initiating, using the software logistics protocol, a software logistics process, the software logistics protocol being a common application programming interface (API) for controlling and managing the life cycle and operation of a plurality of different software logistics processes; monitoring, using the software logistics protocol, the progress of execution of the software logistics process; and gathering, using the software logistics protocol, output information from the software logistics process after the software logistics process finishes executing.

20 Claims, 6 Drawing Sheets

(56) References Cited

U.S. PATENT DOCUMENTS

| | | |
|---|---|---|
| 2004/0117414 A1* | 6/2004 | Braun et al. .................. 707/204 |
| 2004/0123283 A1* | 6/2004 | Brown et al. .................. 717/171 |
| 2004/0268338 A1* | 12/2004 | Gurpinar et al. ............. 717/169 |
| 2005/0091417 A1* | 4/2005 | Bhogal .............................. 710/1 |
| 2006/0248522 A1* | 11/2006 | Lakshminarayanan et al. ............................ 717/174 |
| 2008/0307413 A1* | 12/2008 | Ferris ........................ G06F 8/60 717/178 |
| 2009/0249279 A1* | 10/2009 | Bourdon ................... G06F 8/61 717/101 |
| 2010/0153341 A1 | 6/2010 | Driesen et al. |
| 2010/0332585 A1 | 12/2010 | Driesen |
| 2011/0271272 A1* | 11/2011 | Chow ................. G06F 9/44536 717/173 |
| 2012/0005670 A1 | 1/2012 | Driesen et al. |
| 2012/0011190 A1 | 1/2012 | Driesen et al. |
| 2012/0011389 A1 | 1/2012 | Driesen et al. |
| 2012/0023125 A1 | 1/2012 | Driesen et al. |
| 2012/0030184 A1 | 2/2012 | Driesen et al. |
| 2012/0036165 A1 | 2/2012 | Driesen et al. |
| 2012/0041933 A1 | 2/2012 | Driesen |
| 2012/0041988 A1 | 2/2012 | Driesen |
| 2012/0047185 A1 | 2/2012 | Driesen et al. |
| 2012/0159421 A1 | 6/2012 | Driesen |
| 2012/0166393 A1 | 6/2012 | Hoprich et al. |
| 2012/0265726 A1* | 10/2012 | Padmanabhan et al. ...... 707/602 |
| 2012/0303665 A1 | 11/2012 | Engelko et al. |
| 2012/0317168 A1 | 12/2012 | Driesen et al. |
| 2013/0080339 A1 | 3/2013 | Driesen et al. |
| 2013/0080617 A1 | 3/2013 | Driesen et al. |
| 2013/0159247 A1 | 6/2013 | Engelko et al. |
| 2013/0159427 A1 | 6/2013 | Jahr et al. |
| 2013/0191820 A1 | 7/2013 | Jahr et al. |
| 2013/0298116 A1* | 11/2013 | Ou ............................ G06F 8/61 717/170 |
| 2014/0143768 A1* | 5/2014 | Kazalski ................... G06F 8/60 717/171 |
| 2014/0173587 A1* | 6/2014 | Balachandran et al. ...... 717/173 |
| 2014/0325337 A1* | 10/2014 | McWeeney ................... 715/234 |

* cited by examiner

SOFTWARE LOGISTICS PROTOCOLS

CROSS-REFERENCE TO RELATED APPLICATIONS

This application claims priority to pending U.S. Provisional Application Ser. No. 61/839,224, filed Jun. 25, 2013, the entire contents of which are hereby incorporated by reference.

TECHNICAL BACKGROUND

This disclosure relates to software logistics and, more particularly, a software logistics protocol for management of software logistics processes.

BACKGROUND

Software logistics involves the use of lifecycle management processes used to perform the installation, update, and configuration of the software of application systems. Software logistics tools are typically implemented using various frameworks, programming languages, and technologies. Some of these tools use proprietary solutions for communication with their surrounding environments. Even though the software logistics tools are generally different, there are inherent similarities in the way they operate. For example, some of these tools implement software logistics processes that have status information, that produce logs, that require a parameter input from a user, and so on.

SUMMARY

The present disclosure relates to computer-implemented methods, software, and systems for using a software logistics protocol. In some implementations, techniques for using the software logistics protocol include initiating, using the software logistics protocol, a software logistics process, the software logistics protocol being a common application programming interface (API) for controlling and managing the life cycle and operation of a plurality of different software logistics processes; monitoring, using the software logistics protocol, the progress of execution of the software logistics process; and gathering, using the software logistics protocol, output information from the software logistics process after the software logistics process finishes executing.

Other general implementations include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

In a first aspect combinable with any of the general implementations, initiating the software logistics process comprises: determining, using the software logistics protocol, that the software logistics process is not available on a target computer system of one or more computers; deploying, using the software logistics protocol, the software logistics process on the target computing system; configuring, using the software logistics protocol, the software logistics process on the target system; and executing, using the software logistics protocol, the software logistics process.

In a second aspect combinable with any of the previous aspects, monitoring the progress of execution of the software logistics process comprises: determining, using the software logistics protocol, that an error has occurred in the execution of the software logistics process; and accessing, using the software logistics protocol, one or more logs of the software logistics process.

In a third aspect combinable with any of the previous aspects, monitoring the progress of execution of the software logistics process comprises: determining, using the software logistics protocol, that an error has occurred in the execution of the software logistics process or any other interaction is required in the execution; and accessing, using the software logistics protocol, one or more configuration files or parameters of the software logistics process.

In a fourth aspect combinable with any of the previous aspects, monitoring the progress of execution of the software logistics process comprises: determining, using the software logistics protocol, that an error has occurred in the execution of the software logistics process; and controlling, using the software logistics protocol, to resume, to stop, to reject, or to abort the software logistics process.

In a fifth aspect combinable with any of the previous aspects, monitoring the progress of execution of the software logistics process comprises registering, using the software logistics protocol, to receive progress notifications and runtime statistics from the software logistics process.

In a sixth aspect combinable with any of the previous aspects, the software logistics protocol is based on the Representational State Transfer (REST) design model.

In a seventh aspect combinable with any of the previous aspects, the software logistics protocol is based on the Hypertext Transfer Protocol (HTTP), and wherein monitoring the progress of execution of the software logistics process comprises executing a GET or POST HTTP method on a resource of the software logistics process to get or set a parameter for the execution of the software logistic process.

In an eighth aspect combinable with any of the previous aspects, the software logistics process comprises one or more of: an update process, a configuration process, an installation process, and a migration process.

In a ninth aspect combinable with any of the previous aspects, the software logistics process directly controls one or more other software logistics processes to accomplish one or more sub-tasks of the software logistics process.

Various implementations of a computing system according to the present disclosure may have one or more of the following features. The software logistics protocol can provide standardization of remote management and execution of software logistics tools; it can provide simpler orchestration and composition of different tools into more sophisticated end-to-end landscape management processes; it can provide a common user interface implementation and consistent user experience; it can provide easier incorporation of software logistics tools from acquired software; and it can provide integration with third party offerings and implementation of customer specific landscape management solutions.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

Figure 1:
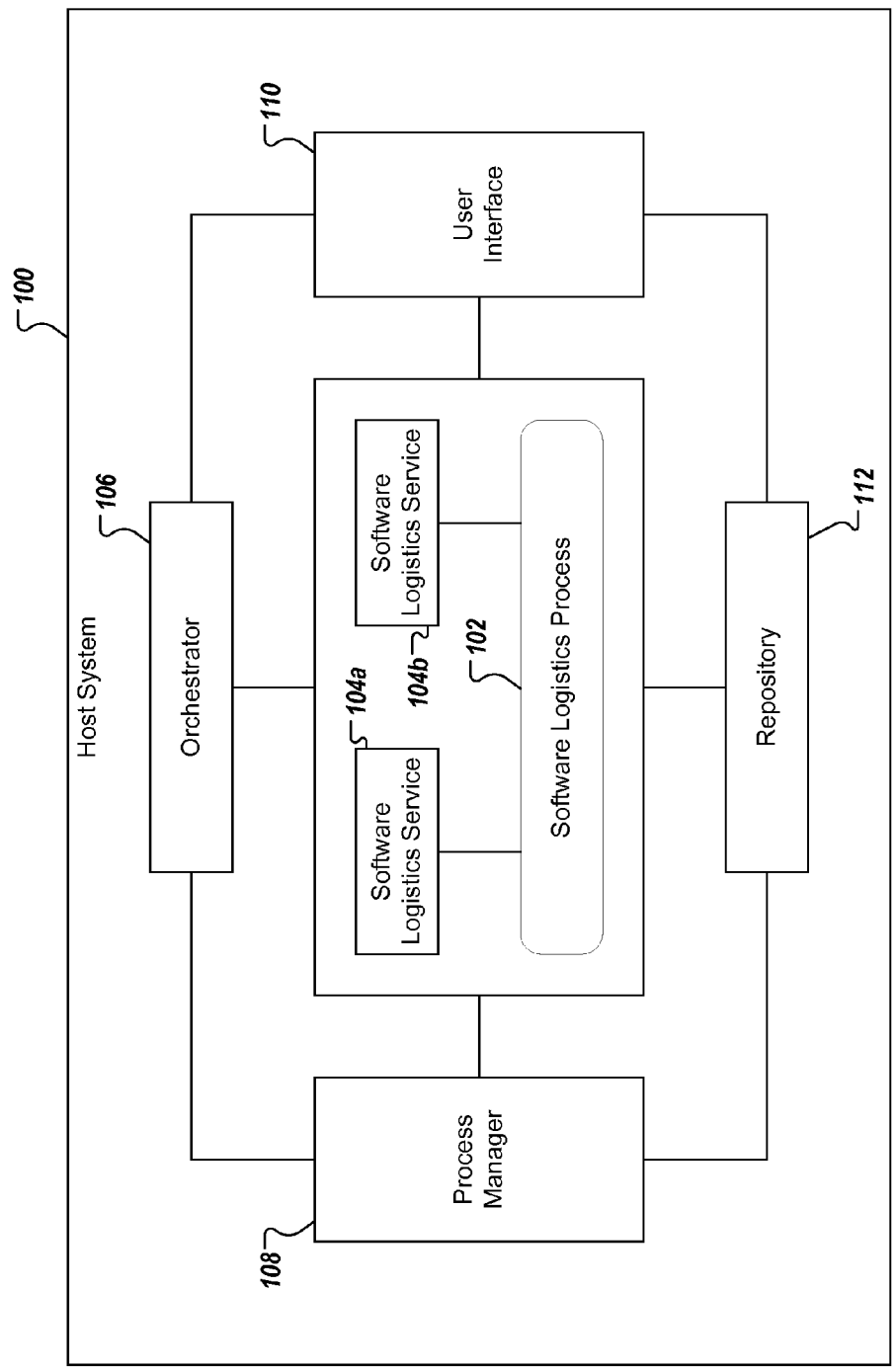
FIG. 1 illustrates an example host system that executes a software logistics process.

FIG. 1 illustrates an example host system 100 that executes a software logistics process 102. For example, the illustrated host system 100 includes or can be communicably coupled with various other kinds of systems, e.g., an on-demand computing system, an on-premise computing system, and a database, at least some of which can communicate across a data communications network. In general, the host system 100 is a server or other computing system that stores one or more applications, e.g., a hosted application, where the hosted application can be executed via requests and responses sent to users or clients within and communicably coupled to the illustrated host system 100 of FIG. 1.

The software logistics process 102 performs one or more tasks related to the life cycle management of one or more of the applications on the host system 100. For example, the software logistics process can install, configure, and update one of the applications by executing one or more software logistics services 104a and 104b. In some examples, the host system 100 may store a plurality of various hosted applications, while in some examples, the host system 100 may be a dedicated server meant to store and execute only a single hosted application. In some instances, the host system 100 may comprise a web server, where the hosted applications represent one or more web-based applications accessed and executed via the network.

The host system 100 uses a software logistics protocol that leverages the similarities between different software logistics processes for controlling and managing the life cycle and operation of software logistics services. The software logistics protocol enables transformation of software logistics services into a software logistics platform that provides, for various systems and processes, the software logistics services and processes that can be combined into a customizable and automated end-to-end software logistics applications that can span a whole customer landscape.

At a high level, the host system 100 comprises one or more electronic computing devices operable to receive, transmit, process, store, or manage data and information associated with the software logistics process 102. For example, the host system 100 illustrated in FIG. 1 can be responsible for receiving application requests from one or more client applications and responding to the received requests by processing said requests in the associated hosted application, and sending the appropriate response from the hosted application back to the requesting client application. In addition, requests associated with the hosted applications may also be sent from internal users, external or third-party customers, other automated applications, as well as any other appropriate entities, individuals, systems, or computers.

As used in the present disclosure, the term "computer" is intended to encompass any suitable processing device. For example, the host system 100 can be implemented using one or more servers, as well as computers other than servers, including a server pool. In some examples, the host system 100 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the host system 100 may be adapted to execute any operating system, including Linux, UNIX, Windows, Mac OS, or any other suitable operating system.

Regardless of the particular implementation, "software" may include computer-readable instructions, firmware, wired or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The host system 100 further includes a processor, and two or more processors may be used according to particular needs, desires, or particular implementations of the example host system 100. The processor may be a central processing unit (CPU), a blade, an application specific integrated circuit (ASIC), a field-programmable gate array (FPGA), or another suitable component. Generally, the processor executes instructions and manipulates data to perform the operations of the host system 100.

The host system 100 also includes a memory, and two or more memories may be used according to particular needs, desires, or particular implementations of the example host system 100. In some implementations, the memory can be external to the host system 100. The memory may include any memory or database module and may take the form of volatile or non-volatile memory including, without limitation, magnetic media, optical media, random access memory (RAM), read-only memory (ROM), removable media, or any other suitable local or remote memory component. The memory may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the host system 100. Additionally, the memory may include any other appropriate data, such as VPN applications, firmware logs and policies, firewall policies, a security or access log, print or other reporting files, as well as others.

The host system includes an orchestrator module 106, a process manager 108, a user interface 110, and a repository 112. The orchestrator 106 is configured to manage execution of composite software logistics processes involving more than one software logistics service. The orchestrator 106 can be based on a generic algorithm that can be implemented in different components in a way most suitable for the underlying scenario. Specific orchestration tools are optional and can be used for application specific software logistics processes; standard processes can be orchestrated by a particular software logistics service.

The process manager 108 can act as a host agent and perform various management functions related to the software logistics process. In some examples, the process manager 108 performs instance discovery and inventory, instance control, database monitoring and management, system or instance provisioning, and the like. The user interface 110 can implement the client side of the software logistics protocol or one or more sub-protocols of the software logistics protocol. The user interface 110 can be compatible with other software logistics services or other server components by using the software logistics protocol.

Figure 2A:
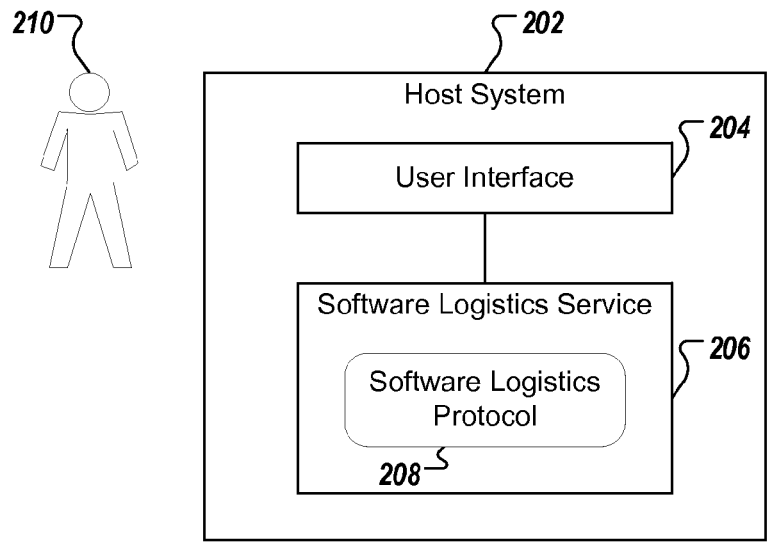
FIGS. 2A-C are block diagrams illustrating example use cases of a software logistics protocol.
Figure 2B:
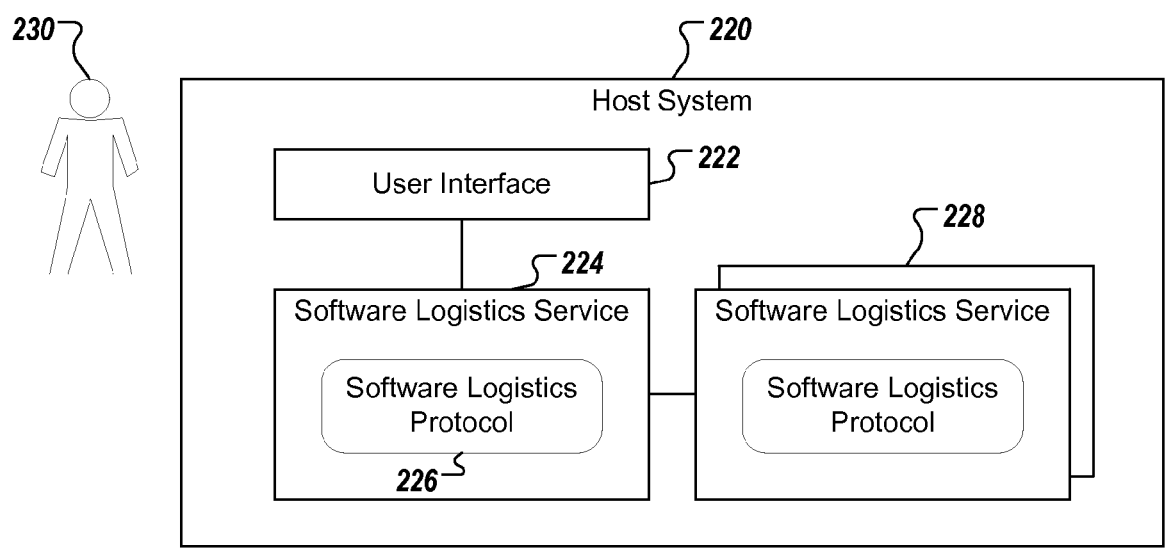
Figure 2C:
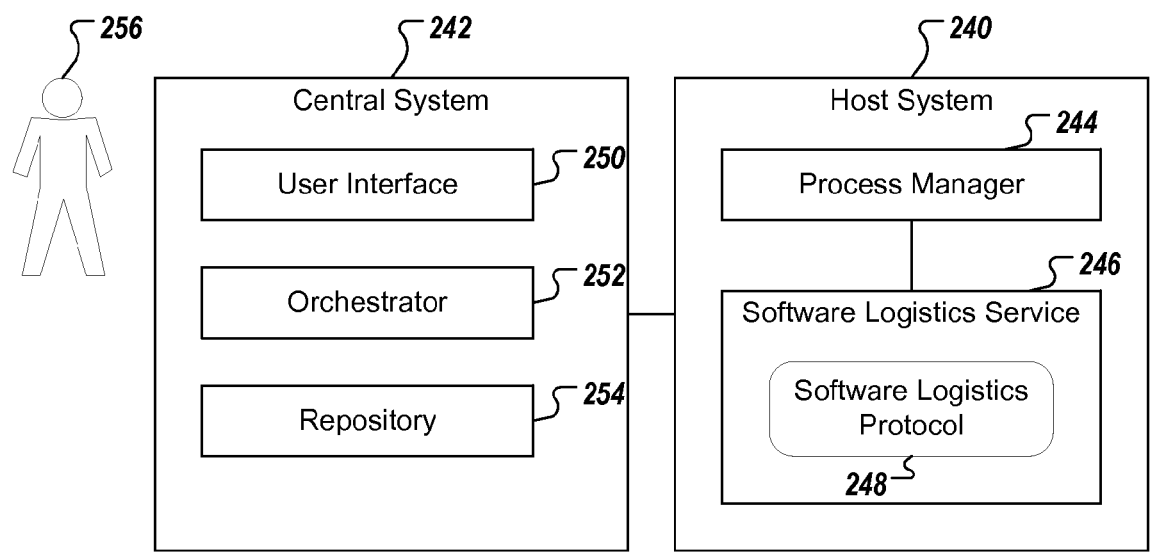

The repository can provide the facility to share information, e.g., user input, between different components involved in the execution of a software logistics process. The repository is optional because the software logistics protocol can support direct exchange of the parameters between software logistics services. The repository can be used in scenarios where a customer wants to preserve a set of standard parameters for routine execution of software logistics processes, e.g., input templates. The repository can be used to support segregation of duties where parameter or input templates can be defined by different persons having different roles but all parameter or input templates are used in one software logistics process FIGS. 2A-C are block diagrams illustrating example use cases of a software logistics protocol. FIG. 2A illustrates a host system 202 executing a user interface 204 and a software logistics service 206 using the software logistics protocol 208. The software logistics service 206 can be, e.g., an installation, update, or configuration tool. A user 210 controls the software logistics service 206 directly through the user interface 204.

FIG. 2B illustrates a host system 220 executing a user interface 222 and a leading software logistics service 224 using the software logistics protocol 226. In this scenario the leading software logistics service 224 directly controls one or more other software logistics services 228 to accomplish a dedicated sub-task of an overall software logistics process. The leading positions in this scenario is of the logical nature defined by the use case. A user 230 can control the leading software logistics service 224 through the user interface 222.

FIG. 2C illustrates a host system 240 and a central system 242. The host system 240 executes a process manager 244 and a software logistics service 246 using the software logistics protocol 248. The central system executes a user interface 250 for a user 256 and an orchestrator 252 and a repository 254. The central system 242 is configured to manage and execute different software logistics processes on different physical host systems.

Figure 3A:
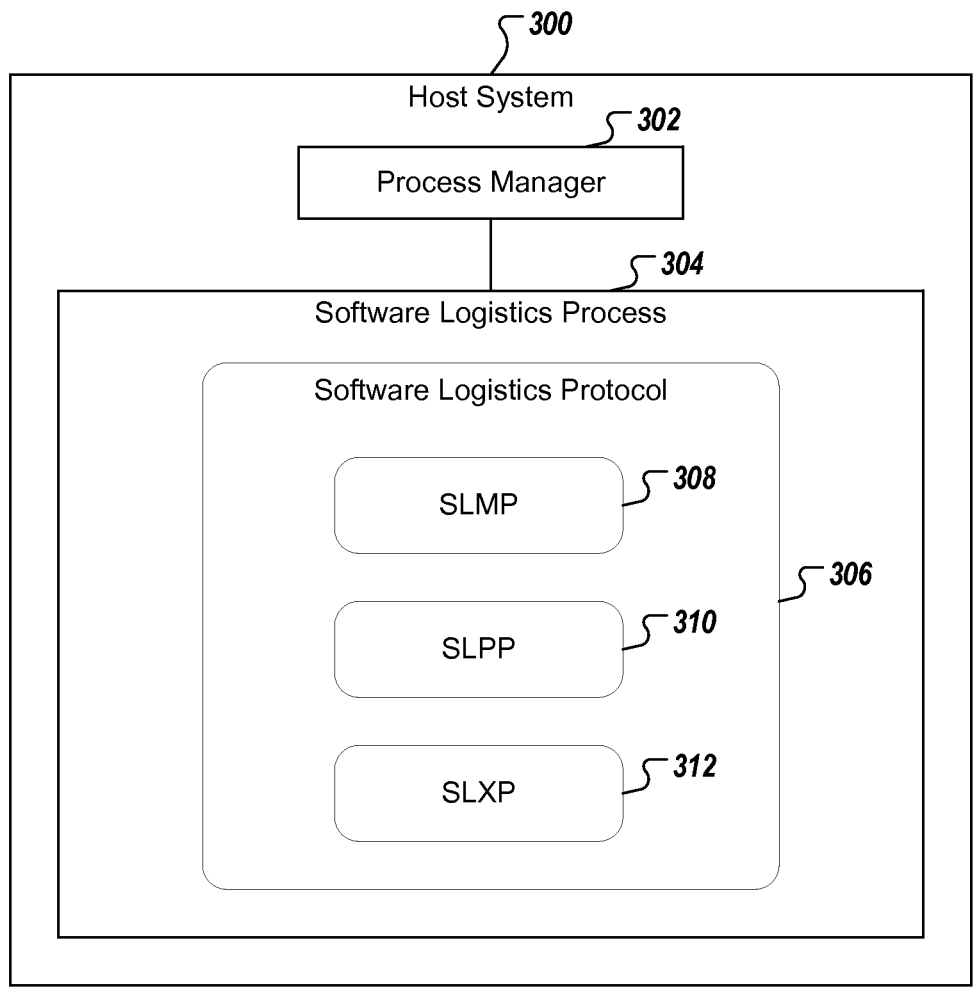
FIG. 3A illustrates an example host system that executes a process manager of an example software logistics process using an example software logistics protocol.

FIG. 3A illustrates an example host system 300 that executes a process manager 302 of an example software logistics process 304 using an example software logistics protocol 306. The software logistics protocol 306 comprises three sub-protocols that can be implemented by different logical components. A sub-protocol can include, for example, a mandatory data model (entities and relationships), an optional data model (entities and relationships), and an extensible data model (entities, relationships, attributes).

The first sub-protocol 308 is a Software Logistics Management Protocol (SLMP) for remote management of tools and processes. It can be implemented using a software logistics process. The second sub-protocol 310 is a Software Logistics Process Control Protocol (SLPP) for monitoring and controlling an executing process. It can be implemented using a process component. The third sub-protocol 312 is a Software Logistics Data Exchange Protocol (SLXP) for information exchange between different involved components, e.g., software logistics processes exchanges, parameters, and results. It can be implemented using a shared repository. These three sub-protocols are logical components that can be implemented in a single physical component.

A software logistics process can be represented as a tree of tasks starting with a top level task and going down through a hierarchical structure of steps. A step can be, for example, a roadmap step that denotes a user understandable "high level" task which can be shown in a user interface to provide an orientation in the whole process without providing an overwhelming number of technical details. Software logistics processes can be nested. In the case of nested processes, the tasks hierarchy can include multiple road map levels. The client can configure how and whether to handle the additional roadmaps of sub-tasks.

A task can have a name, an identifier, and a state. The SLPP sub-protocol 310 can define a number of possible states and transitions between the states, e.g., states that flow without external interactions, manual transitions, or both. Examples of possible states include: initial (task is ready but has not started yet), running (task is being executed without any need for special handling), finished (task finished successfully), error (the task is being executed but has entered into a situation that requires an external intervention), dialog (the task is currently being executed but requires additional information to continue), action required (the task is currently being executed but has sub tasks that cannot be automatically merged), aborted (the execution of the task was finished by an external interruption), and skipped (the task was intentionally skipped in the current process execution). Other states are possible.

The sub-protocols can be implemented based on the Representational State Transfer (REST) design model so that one or more resources are defined for a running process instance. For example, the SLPP sub-protocol 310 can define a process instance resource having a task list resource, a monitoring resource, a roadmap resource, a configuration resource, a log resource, and an actions resource. The SLMP sub-protocol 308 can define a process manager resource having a processes resource and an instances resource.

In some implementations, the software logistics protocol 306 intentionally defines a minimalistic API model. The software logistics protocol 306 can support extensibility on different levels. For example, the software logistics protocol 306 can have a core layer of entities implemented in all components supporting the software logistics protocol 306, an optional layer defining the entities used mainly for user interactions with software logistics processes and services, and an extended layer for entities not defined by the software logistics protocol 306.

In some implementations where the software logistics protocol 306 comprises resources that represent information provided by the protocol implementers and communication patterns that define how the resources should be accessed and used, the structure of each resource can be described using an abstract data model. The abstract data model can be mapped on different concrete representations which are then used for the transfer of the concrete data. Communication patterns can be connected to the concrete underlying protocol.

For example, the data model can be exposed to a client by an OData service. The data model can include a control component that implements monitoring functionality and, in some cases, extends it with additional features so that a client configured to control a software logistics process only has to work with one entry point. The monitor and control features can be accessible on different entry points (e.g., URLs) to enable simpler security administration.

An example monitor component provides a minimal data set for client tools to monitor a software logistics process. It can be available for any client, e.g., without authorization in some cases, and can represent a minimum level of conformance to the protocol. The monitor component can include attributes such as the URL and URI of the process, a process instance identifier, a global instance identifier to express relationships in composite processes, a display name in human suitable form that can be language specific, a process state, a current technical step being executed and a name for the technical step in human suitable form that can be language specific, the executed percentage of the process, a refresh rate that is a time interval suggested by the process for state update requests, a parent identifier of a parent process to express the nested of processes, and so on.

An example control component extends the monitor component with capabilities for controlling a process. It can, in some cases, only be available to administrators. In some cases, a client authorized to and capable of usage of the control component does not need to use the monitor component, and instead gets information from the control component. The set of actions that a client can execute on an active process depends on the state of the process. An action can be implemented as a link that can be accessed using a POST HTTP method, for example. The software logistics protocol can define a minimal set of actions that should be supported by all software logistics processes. Particular processes can then provide additional specific actions.

In some implementations, the software logistics protocol 306 can be described using a domain specific language. This can be useful, for example, for having a flexible and extensible facility for describing relevant aspects of the protocol in a machine readable format instead of a written document, for keeping necessary information up to date and in one location, and for automated generation of protocol related software artifacts like server and client libraries for different languages and platforms. A generator based approach can be used to implement the protocol in a particular software logistics service. The generator can ensure the usage of the latest specification and centralization of bug fixes and other implementation improvements in case one implementation is shared between different services.

Figure 3B:
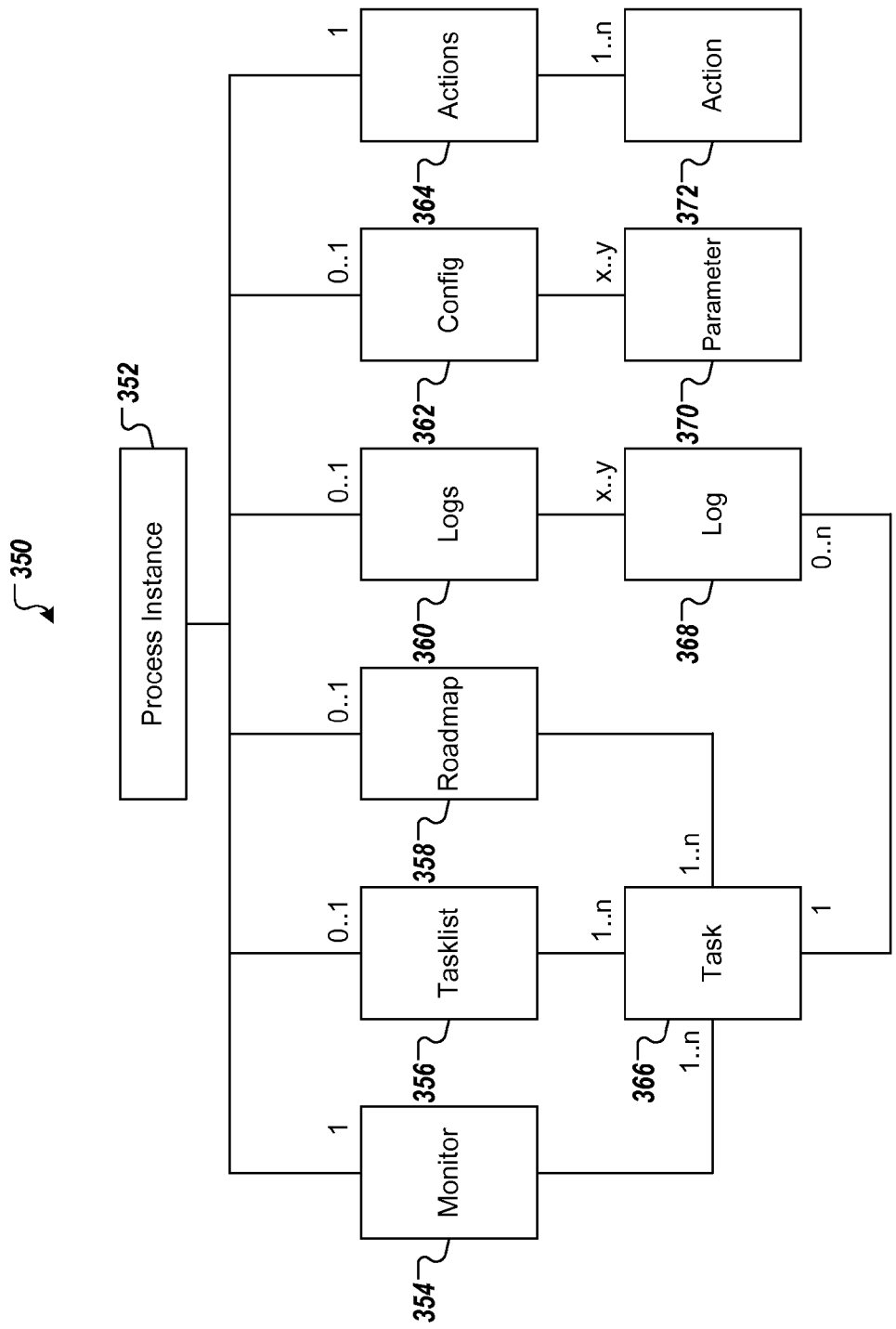
FIG. 3B is a block diagram of an example software logistics sub-protocol.

FIG. 3B is a block diagram of an example software logistics sub-protocol 350. The sub-protocol 350 is a Software Logistics Process Control Protocol (SLPP) for monitoring and controlling an executing process, e.g., the SLPP 310 of FIG. 3A. The sub-protocol 350 is illustrated as a data model centered around a process instance 352.

The sub-protocol 350 includes a mandatory data model and an optional data model. The process instance 352 is a mandatory component that, typically, must be supported by any service to be SLPP compliant. The sub-protocol includes a mandatory monitoring resource 354 and a mandatory actions resource 364. The sub-protocol 350 includes optional resources, including a tasklist resource 356, a roadmap resource 358, a logs resource 360, and a config resource 362. The sub-protocol 350 includes elements corresponding to the resources, including one or more tasks 366, one or more log files 360, one or more parameters 370, and one or more actions 372.

Figure 4:
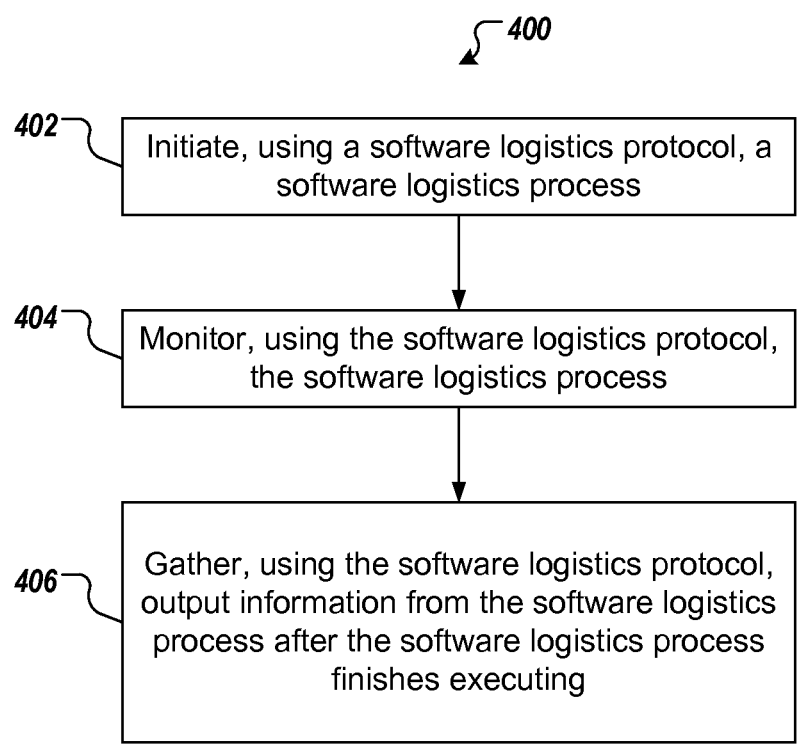
FIG. 4 is a flow chart of an example method for using a software logistics protocol.

FIG. 4 is a flow chart 400 of an example method for using a software logistics protocol. For clarity of presentation, the description that follows generally describes method 400 in the context of FIG. 1. However, method 400 may be performed, for example, by any other suitable system, environment, software, and hardware, or a combination of systems, environments, software, and hardware as appropriate.

A software logistics process is initiated using the software logistics protocol (402). The software logistics protocol is a common API for controlling and managing the life cycle and operation of different software logistics processes. In some implementations, the software logistics protocol is based on the REST design model.

In some implementations, initiating the software logistics process includes determining, using the software logistics protocol, that the software logistics process is not available on a target computer system of one or more computers. The software logistics process is deployed on the target computing system using the software logistics protocol. The software logistics process is configured, using the software logistics protocol, on the target system. The software logistics process is executed using the software logistics protocol. The software logistics protocol can solve bootstrapping problems and ensure the resolution of dependencies and the correct execution sequence.

The software logistics process is monitored using the software logistics protocol (404). In some implementations, monitoring the software logistics process includes determining, using the software logistics protocol, that an error has occurred in the execution of the software logistics process and accessing, using the software logistics protocol, one or more logs of the software logistics process. In some implementations, monitoring the software logistics process includes determining, using the software logistics protocol, that an error has occurred in the execution of the software logistics process and accessing, using the software logistics protocol, one or more configuration files of the software logistics process.

In some implementations, monitoring the software logistics process includes determining, using the software logistics protocol, that an error has occurred in the execution of the software logistics process and resuming, using the software logistics protocol, the software logistics process, or rejecting, using the software logistics protocol, the error that occurred in the execution of the software logistics process. In some implementations, monitoring the software logistics process includes registering, using the software logistics protocol, to receive progress notifications from the software logistics process. In some implementations, the software logistics protocol is based on the Hypertext Transfer Protocol (HTTP), and monitoring the progress of execution of the software logistics process comprises executing a GET or POST HTTP method on a resource of the software logistics process to get or set a parameter for the execution of the software logistic process.

Output information is gathered, using the software logistics protocol, from the software logistics process after the software logistics process finishes executing (406). For example, the software logistics process can provide a notification that the process has finished, and logs can be gathered and processed.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method of using a software logistics protocol, the method comprising:
    initiating, using the software logistics protocol, a software logistics process, the software logistics protocol being a common application programming interface (API) for controlling and managing the life cycle and operation of a plurality of different software logistics processes;
    monitoring, using the software logistics protocol, the progress of execution of the software logistics process;
    providing an abstract data model to a target computing system, the abstract data model describing a structure of one or more resources associated with the software logistics protocol;
    based on the abstract data model, providing a single entry point to the target computing system to monitor the progress of the execution of the software logistics process; and
    gathering, using the software logistics protocol, output information from the software logistics process after the software logistics process finishes executing.

2. The method of claim 1, wherein initiating the software logistics process comprises:
    determining, using the software logistics protocol, that the software logistics process is not available on the target computing system;
    deploying, using the software logistics protocol, the software logistics process on the target computing system;
    configuring, using the software logistics protocol, the software logistics process on the target computing system; and
    executing, using the software logistics protocol, the software logistics process.

3. The method of claim 1, wherein monitoring the progress of execution of the software logistics process comprises:
    determining, using the software logistics protocol, that an error has occurred in the execution of the software logistics process; and
    accessing, using the software logistics protocol, one or more logs of the software logistics process.

4. The method of claim 1, wherein monitoring the progress of execution of the software logistics process comprises:
    determining, using the software logistics protocol, that an error has occurred in the execution of the software logistics process or any other interaction is required in the execution; and
    accessing, using the software logistics protocol, one or more configuration files or parameters of the software logistics process.

5. The method of claim 1, wherein monitoring the progress of execution of the software logistics process comprises:
    determining, using the software logistics protocol, that an error has occurred in the execution of the software logistics process; and
    controlling, using the software logistics protocol, to resume, to stop, to reject, or to abort the software logistics process.

6. The method of claim 1, wherein monitoring the progress of execution of the software logistics process comprises registering, using the software logistics protocol, to receive progress notifications and runtime statistics from the software logistics process.

7. The method of claim 1, wherein the software logistics protocol is based on the Representational State Transfer (REST) design model.

8. The method of claim 1, wherein the software logistics protocol is based on the Hypertext Transfer Protocol (HTTP), and wherein monitoring the progress of execution of the software logistics process comprises executing a GET or POST HTTP method on a particular resource of the one or more resources to get or set a parameter for the execution of the software logistic process.

9. The method of claim 1, wherein the software logistics process comprises one or more of: an update process, a configuration process, an installation process, and a migration process.

10. The method of claim 1, wherein the software logistics process controls one or more other software logistics processes to accomplish one or more sub-tasks of the software logistics process.

11. A non-transitory computer storage medium encoded with a computer program, the program comprising instructions that when executed by one or more computers cause the one or more computers to perform operations comprising:
   initiating, using the software logistics protocol, a software logistics process, the software logistics protocol being a common application programming interface (API) for controlling and managing the life cycle and operation of a plurality of different software logistics processes;
   monitoring, using the software logistics protocol, the progress of execution of the software logistics process;
   providing an abstract data model to a target computing system, the abstract data model describing a structure of one or more resources associated with the software logistics protocol;
   based on the abstract data model, providing a single entry point to the target computing system to monitor the progress of the execution of the software logistics process; and
   gathering, using the software logistics protocol, output information from the software logistics process after the software logistics process finishes executing.

12. The computer storage medium of claim 11, wherein initiating the software logistics process comprises:
   determining, using the software logistics protocol, that the software logistics process is not available on the target computing system;
   deploying, using the software logistics protocol, the software logistics process on the target computing system;
   configuring, using the software logistics protocol, the software logistics process on the target computing system; and
   executing, using the software logistics protocol, the software logistics process.

13. The computer storage medium of claim 11, wherein monitoring the progress of execution of the software logistics process comprises:
   determining, using the software logistics protocol, that an error has occurred in the execution of the software logistics process or any other interaction is required in the execution; and
   accessing, using the software logistics protocol, one or more logs of the software logistics process.

14. The computer storage medium of claim 11, wherein monitoring the progress of execution of the software logistics process comprises:
   determining, using the software logistics protocol, that an error has occurred in the execution of the software logistics process; and
   controlling, using the software logistics protocol, to resume, to stop, to reject, or to abort the software logistics process.

15. The computer storage medium of claim 11, wherein monitoring the progress of execution of the software logistics process comprises:
   determining, using the software logistics protocol, that an error has occurred in the execution of the software logistics process; and
   resuming, using the software logistics protocol, the software logistics process, or rejecting, using the software logistics protocol, the error that occurred in the execution of the software logistics process.

16. The computer storage medium of claim 11, wherein monitoring the progress of execution of the software logistics process comprises registering, using the software logistics protocol, to receive progress notifications and runtime statistics from the software logistics process.

17. The computer storage medium of claim 11, wherein the software logistics protocol is based on the Representational State Transfer (REST) design model.

18. The computer storage medium of claim 11, wherein the software logistics protocol is based on the Hypertext Transfer Protocol (HTTP), and wherein monitoring the progress of execution of the software logistics process comprises executing a GET or POST HTTP method on a particular resource of the one or more resources to get or set a parameter for the execution of the software logistic process.

19. The computer storage medium of claim 11, wherein the software logistics process comprises one or more of: an update process, a configuration process, an installation process, and a migration process.

20. The computer storage medium of claim 11, wherein the software logistics process controls one or more other software logistics processes to accomplish one or more sub-tasks of the software logistics process.

* * * * *